United States Patent [19]

Crawford et al.

[11] 4,036,768
[45] July 19, 1977

[54] POLYMETHACRYLATE AND LUBE COMPOSITION THEREOF

[75] Inventors: Wheeler C. Crawford, Houston, Tex.; Roy I. Yamamoto, Wappingers Falls; Carmen M. Cusano, Poughkeepsie, both of N.Y.

[73] Assignee: Texaco Inc., New York, N.Y.

[21] Appl. No.: 696,152

[22] Filed: June 14, 1976

[51] Int. Cl.$^2$ .............................................. C10M 1/28
[52] U.S. Cl. ................................ 252/51.5 A; 526/312
[58] Field of Search .................... 252/51.5 A; 526/312

[56] References Cited

U.S. PATENT DOCUMENTS

| 3,251,906 | 5/1966 | Bauer | 252/51.5 A |
|---|---|---|---|
| 3,304,260 | 2/1967 | Fields et al. | 252/51.5 A |
| 3,816,314 | 6/1974 | Pappas et al. | 252/51.5 A |
| 3,816,315 | 6/1974 | Morduchowitz | 252/51.5 A |
| 3,892,671 | 7/1975 | Song et al. | 252/51.5 A |

*Primary Examiner*—Arthur P. Demers
*Attorney, Agent, or Firm*—Thomas H. Whaley; Carl G. Ries; Robert A. Kulason

[57] ABSTRACT

A complex product of (1) an interpolymer of dialkylaminoalkyl methacrylate, $C_1$-$C_6$ alkyl methacrylate, $C_{10}$-$C_{14}$ alkyl methacrylate and $C_{16}$-$C_{20}$ alkyl methacrylate monomers and (2) a liquid alkylbenzene of a molecular weight between about 100 and 5000, prepared by polymerizing the monomers comprising said interpolymer in the presence of said liquid alkylbenzene. A mineral oil composition of improved viscosity, pour depressing and detergent-dispersant properties and concentrates thereof comprising between about 10 and 95 wt. % of a mineral oil of lubricating viscosity and between about 0.1 and 90 wt. % of said complex product.

6 Claims, No Drawings

POLYMETHACRYLATE AND LUBE COMPOSITION THEREOF

BACKGROUND OF INVENTION

Polymeric additives derived from acrylic and methacrylic acids are extensively used in mineral lubricating oil compositions, particularly in automatic transmission fluids and crankcase oils, to impart desirable viscosity-temperature characteristics to the compositions. These additives are designed to modify lubricating oil so that changes in viscosity occurring with variations in temperature are kept as small as possible. Lubricating oils containing such polymeric additives essentially maintain their viscosity at the high temperatures normally encountered in engine and transmission operations while at the same time maintaining a desirably low viscosity fluidity at engine starting temperatures. The ability of the hydrocarbon oil to accommodate increased and decreased temperatures with a minimum change in viscosity is indicated by its Viscosity Index (VI). The greater this ability the higher the VI. Because of the aforementioned properties, these polymeric additives have been conveniently termed both "thickeners" and "VI improvers."

The increasing demands made by the present day engines and automatic transmissions due to increased antipollution and performance requirements have increased a need for crankcase and automatic transmission fluid additives which have multifunctional properties in order to prevent a buildup of such large quantities of additives required to meet the specification as to pose a danger of a quantity so large as to negatively effect the primary mission of the crankcase oil or transmission fluid. One class of additives that meets this requirement are the dialkylaminoalkyl-, $C_1$–$C_6$ alkyl, $C_{10}$–$C_{14}$ alkyl, $C_{16}$–$C_{20}$ alkyl methacrylate interpolymers of a molecular weight of between $5 \times 10^4$ and $10^6$. These polymethacrylates not only provide improved VI properties to crankcase and transmission oils, but also have the properties of imparting improved dispersancy, low temperature fluidity and antioxidant properties thereto. The component which principally contributes to the improved detergent and antioxidant properties is the dialkylaminoalkyl methacrylate, the improvement generally in proportional relationship with the amino methacrylate content. Since this particular component is relatively costly, there is a continuing search to improve the pour depressancy and antioxidant properties of these dialkylaminoalkyl containing polymers without increasing the dialkylaminoalkyl methacrylate content or alternatively producing an interpolymer in which the dialkylaminoalkyl methacrylate content can be decreased without an equivalent reduction in detergent and antioxidant properties.

SUMMARY OF INVENTION

We have discovered and this constitutes our invention a complex reaction product of an interpolymer of dialkylaminoalkyl methacrylate, and $C_1$–$C_6$ alkyl methacrylate, $C_{10}$–$C_{14}$ alkyl methacrylate, and $C_{16}$–$C_{20}$ alkyl methacrylate, and a liquid alkylbenzene of a molecular weight of between about 100 and 5000 prepared by polymerizing the monomeric components of the interpolymer in the presence of said alkylbenzene which not only results in a product of good VI improving properties but also a product which has improved dispersant and antioxidant properties when incorporated in automatic transmission and crankcase fluids for a given nitrogen content. Hereinbefore and hereinafter the term "alkylbenzene" encompasses mono as well as polyalkyl substituted benzenes.

Within the scope of our invention there is also included finished mineral oil compositions containing as a major component (75 to 95 wt. %) mineral oil of a lubricating oil viscosity between about 0.1 and 10 wt. % of the polymethacrylate-alkylbenzene complex the remainder supplementary additives as well as concentrates thereof containing 10 to 90 wt. % of the complex and 10 to 90 wt. % mineral oil. Concentrates are formed for the purpose of storage and handling and are blended with additional mineral oil to form the finished compositions suitable for use.

DETAILED DESCRIPTION OF THE INVENTION

More specifically, the interpolymeric polymethacrylate-alkylbenzene components in the complex reaction product are present in a weight ratio of polymethacrylate-alkylbenzene of between about 4:1 and 2:3. The monomers composing the interpolymer are as follows:

1. Dialkylaminoalkyl methacrylate characterized by the formula:

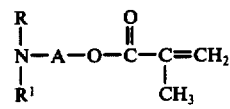

where R and $R^1$ are alkyl of from 1 to 2 carbons and A is a saturated aliphatic hydrocarbon (alkanediyl) of from 1 to 5 carbons.

2. $C_1$–$C_6$ alkyl methacrylate of the formula:

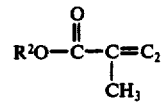

where $R^2$ is alkyl of from 1 to 6 carbons.

3. $C_{10}$–$C_{14}$ alkyl methacrylate of the formula:

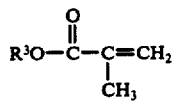

where $R^3$ is alkyl of from 10 to 14 carbons and

4. $C_{16}$–$C_{20}$ alkyl methacrylate of the formula:

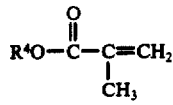

where $R^4$ is alkyl of from 16 to 20 carbons, said interpolymer having an intrinsic viscosity in benzene at 77° of between about 0.1 and 2.5, preferably between about 0.3 and 0.8, a molecular weight (membrane osmometry) of between about 50,000 and $10^6$, preferably between about $10^5$ and $3 \times 10^5$, said interpolymer consisting of between about 1 and 10 wt. % of said dialkylaminoalkyl methacrylate, between about 15 and 30 wt. % of said $C_1$–$C_6$ alkylmethacrylate, between about 40 and 60 wt.

% of said $C_{10}$–$C_{14}$ alkyl methacrylate and between about 15 and 30 wt. % of said $C_{16}$–$C_{20}$ alkyl methacrylate.

As heretofore stated the liquid alkylbenzene reaction solvents contemplated herein are of a molecular weight of between about 100 and 5000. The alkylbenzene is further characterized by the formula:

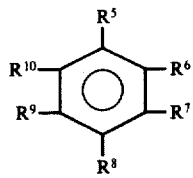

where $R^5$ is alkyl and $R^6$, $R^7$, $R^8$, $R^9$ and $R^{10}$ are hydrogen or alkyl, said $R^5$ through $R^{10}$ groups containing a total of between about 1 and 300 carbons. Specific examples of alkylbenzenes contemplated herein are dialkylbenzene of a molecular weight of about 405 sold by Continental Oil Company under the tradename Conoco DN-600: an alkylbenzene of the above formula where $R^5$ is 2-ethylhexyl, $R^8$ is $CH_3(CH_2)_{\overline{100}}$ and $R^6$, $R^7$, $R^9$ and $R^{10}$ are hydrogen; where $R^5$ and $R^6$ are isodecyl, $R^{10}$ is octadecyl and $R^7$, $R^8$ and $R^9$ are hydrogen; where $R^5$ is $CH_3$–$(CH_2)_{\overline{50}}$ and $R^6$, $R^7$, $R^8$, $R^9$, and $R^{10}$ are hydrogen; and where $R^5$ is eicosyl, $R^7$ is

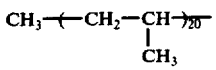

and $R^6$, $R^8$, $R^9$ and $R^{10}$ are hydrogen

The polymethacrylate-alkylbenzene complex reaction product is prepared by standard polymerization techniques with the exception polymerization of the methacrylate monomers takes place in the presence of the liquid alkylbenzene as defined in a weight ratio of total methacrylate monomer to alkylbenzene of between about 4:1 and 2:3, preferably about 2:1. More particularly, the alkyl methacrylate monomers and the liquid alkylbenzene reaction solvent are charged to a reaction vessel in an individual quantity component amount equal to the component ratios desired in the final complex product. Polymerization is conducted at a temperature of between about 50° and 100° C. in the presence of between about 0.05 and 0.04 wt. % of a standard polymerization catalyst such as azobisisobutyronitrile and between about 0.01 and 0.2 wt. % based on the reaction mixture of a standard transfer agent such as lauryl mercaptan. Polymerization is continued until all the monomers are consumed, normally measured in terms of refractive index. If the desired degree of polymerization is not attained, additional polymerization catalyst in the aforementioned quantities can be added. Advantageously, polymerization is conducted under agitated conditions in the presence of an inert atmosphere such as nitrogen utilizing multiple catalyst additions, e.g., 2 to 5 additions. Under further advantageous conditions, diluent oil may be added during the second or later dose of polymerization catalyst, normally in an amount of between about 0 and 250 wt. % of the reaction mixture. It is to be noted that the termination of polymerization is signified in a particular catalyst addition phase by the refractive index remaining essentially constant.

The exact mechanism by which the improved dispersancy and oxidative stability is achieved by the complex has yet to be determined. However, it is theorized the liquid alkylbenzene reaction solvent becomes "associated" with the polymethacrylate to increase the solubility of the polymethacrylate in the oil which allows more oxidized materials and particles to be suspended therein. Such a solvent effect could also be described in terms of a "complex" formed between the polymer and polymerization solvent or in terms of the polymerization solvent as a cosolvent for the polymer and diluent mineral oil.

In the preparation of the aforedescribed interpolymer of the complex, specific examples of the dialkylaminoalkyl methacrylate contemplated herein are N,N-dimethylaminoethyl methacrylate, N,N-diethylaminoethyl methacrylate, N,N-dimethylaminopropyl methacrylate and N,N-diethylaminopropyl methacrylate and mixtures thereof.

Specific examples of the $C_1$–$C_6$ alkyl methacrylate are methyl methacrylate, butyl methacrylate and hexyl methacrylate.

Examples of the $C_{10}$–$C_{14}$ alkyl methacrylates are decyl methacrylate, undecyl methacrylate, dodecyl methacrylate, tridecyl methacrylate, tetradecyl methacrylate and mixtures of alkyl methacrylates falling essentially within the defined alkyl carbon range, when commercial alcohols are employed in the monomer since many commercial alcohols are in actuality a mixture of adjacent and closely adjacent homologs with one or two carbon chain lengths predominating.

Specific examples of the $C_{16}$–$C_{20}$ alkyl methacrylates contemplated herein are hexadecyl methacrylate, heptadecyl methacrylate, octadecyl methacrylate, nonadecyl methacrylate, eicosyl methacrylate and mixtures thereof.

The mineral hydrocarbon oils of lubricating viscosity contemplated for optional use in the preparation of the polymethacrylate-alkylbenzene complex products as well as in mineral lubricating oil compositions containing said products can be derived from a wide variety of hydrocarbon base oils such as naphthenic base, paraffinic base and mixed base mineral oils, e.g., having a viscosity at 100° F. of between about 35 and 1000 SUS.

When the finished lubricating compositions are to be employed as automatic transmission fluids, the complex product content is desirably between about 0.1 and 10 wt. % and the mineral lubricating oil base is desirably present in an amount between about 85 and 95 wt. %, advantageously, having an SUS viscosity between about 40 and 150 SUS at 100° F., preferably between about 50 and 125, the remainder of the transmission fluid composition being composed of standard additives normally found therein. These additional additives are normally supplementary detergent-dispersants, antirust-corrosion inhibitors, supplemental antioxidants and friction modifiers. Examples of such supplementary additives are set forth in U.S. Pat. No. 3,640,872, for example, detergent-dispersants such as the alkenyl substituted succinic anhydride derivative of polyethylene polyamine, e.g., where the alkenyl group is a polybutene of a molecular weight of about 1200, the amine is hexamethylene pentamine; and antioxidants such as phenylnaphthylamine, phenylenediamine, phenothiazine, diphenylamine; friction modifiers such as a modified carboxylic acid, e.g., N-acyl sarcosine compound represented by the formula:

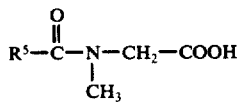

where $R^5$ is an aliphatic radical having from 12 to 70 carbons; antirust and anticorrosive agents such as a mixture of hydrolyzed $C_6$–$C_{18}$ alkenyl succinic anhydride, phenol, mono and di-$C_{12}$ alkyl phosphoric acid esters; and friction modifier life extenders such as zinc di(alkylphenoxypolyalkoxyalkyl) dithiophosphates.

The finished lubricating oil compositions contemplated herein which are particularly suitable for use as crankcase lubricants in internal combustion engines would generally comprise between about 75 and 95 wt. % of a hydrocarbon lubricating base oil, preferably of an SUS viscosity between about 95° and 150° at 100° F. and between 0.1 and 10 wt. % of the complex, the remainder of the engine oil compositions being composed of standard lube oil additives for engines, these additional additives are found in the classes of supplementary detergents, supplementary oxidation inhibitors, corrosion inhibitors, and antifoamants, etc.

Some examples of the supplementary detergent dispersants contemplated herein are ethylene oxide derivatives of inorganic phosphorus acid free, steam hydrolyzed polybutylene (700–5000 m.w.)-$P_2S_5$ reaction product, overbased calcium alkyl aromatic sulfonates having a total base number of at least about 300 and sulfurized normal calcium alkylphenolate. These supplementary detergent dispersants are disclosed in U.S. Pat. Nos. 3,087,956, 3,549,534 and 3,537,966.

Examples of suitable engine oil supplementary antioxidants contemplated herein are zinc and cadmium dialkyldithiophosphate and diaryldithiophosphate, the alkylated diphenylamines, sulfurized diphenylamines, unsulfurized and sulfurized alkylphenols and phenolates and hindered phenols.

Examples of suitable engine oil corrosion inhibitors are zinc dialkyldithiophosphate, zinc diaryldithiophosphate, basic calcium and magnesium sulfonates; calcium, barium and magnesium phenolates.

The following examples futher illustrate the complex products of the invention and compositions thereof but are not to be construed as limitations thereof.

EXAMPLE I

This example illustrates the preparation of the polymethacrylate-alkylbenzene complex VI improver product contemplated herein.

To a 1-liter resin kettle equipped with a nitrogen inlet tube, stirrer, heater, cooling fan, thermistor and thermocouple, the following materials were charged:

| Materials | Grams |
| --- | --- |
| Dimethylaminoethyl Methacrylate | 2 |
| Butyl Methacrylate | 48 |
| Neodol 25L* Methacrylate | 115 |
| Alfol 1620** SP Methacrylate | 35 |
| Conoco DN600 Base Oil | 100 |
| 1-Dodecanethiol | 0.08 |

The reaction mixture was purged with nitrogen for a period of one-third hours with stirring and then heated to 83° C. and 0.4 grams of azobisisobutyronitrile polymerization catalyst were added. Samples of the reaction mixture was periodically withdrawn at one-half hour intervals and the refractive index readings were taken. When the refractive index became constant which was after about 3 hours, 0.15 grams of additional azobisisobutyronitrile was added together with 226 grams of mineral oil of an SUS viscosity of 41 at 100° F. and stirring was continued at about 85° C. temperature. At the end of a 1 hour period, the temperature was raised to 100° C. for 1 hour. The complex product was characterized as a 57 wt. % lube oil solution of dimethylaminoethyl methacrylate (DMAEMA), butyl methacrylate (AMA) interpolymer in complex with dialkylbenzene (405 m.w.) in a respective interpolymer:liquid alkylbenzene weight ratio of 2:1, said interpolymer composed of a monomer weight ratio of 1:24:57.5:17.5 DMAEMA:BMA:NMA:AMA and having an intrinsic viscosity of 0.8 at 77° F. in benzene ($1.8 \times 10^5$ m.w.).

The NMA and the AMA monomers described above are respectively derived from Neodol 25L* and Alfol 1620 SP** which are tradenames for technical grade alkanols respectively of Shell Chemical Co. and Continental Oil Co. of the following typical analyses:

| | Typical Approx. Homolog Distribution, wt. % |
| --- | --- |
| Neodol 25L* (Synthetic Lauryl Alcohol) | |
| Lighter than $C_{12}OH$ | 4 |
| $C_{12}OH$ | 24 |
| $C_{13}OH$ | 24 |
| $C_{14}OH$ | 24 |
| $C_{15}OH$ | 15 |
| $C_{16}OH$ | 2 |
| Alfol 1620** (Synthetic Stearyl Alcohol) | |
| $C_{14}OH$ and lighter | 4 |
| $C_{16}OH$ | 55 |
| $C_{18}OH$ | 28 |
| $C_{20}OH$ | 9 |

The resultant alkyl methacrylate monomers derived from the reaction of methacrylic acid with the above alcohols are in essence a mixture of $C_{12}$ to $C_{16}$ alkyl methacrylates for those derived from Neodol 25L* and $C_{16}$ to $C_{20}$ alkyl methacrylates for those derived from Alfol 1620 SP** with the same weight percent distribution for a specific alkyl methacrylate as is found in the alcohol mixture. This same weight distribution of the $C_{12}$ to $C_{16}$ and $C_{16}$ to $C_{20}$ methacrylate will also carry over into the interpolymer.

The alkylbenzene reaction solvent employed in the above is a dialkylbenzene sold by Continental Oil Co. under the tradename Conoco DN 600. Typical analysis is as follows:

| Tests | Results |
| --- | --- |
| Kin. Vis., cs at 100° F. | 29.1 |
| Kin. Vis., cs at 210° F. | 5.05 |
| Pour Point, ° F. | −65 |
| Brookfield Vis., cp at −40° F. | 8270 |
| Specific Gravity, 60°/60° F. | 0.8630 |
| Molecular Weight | 405 |

EXAMPLE II

This example illustrates the superior oxidation stability and dispersancy of the complex polymethacrylate-alkylbenzene VI improvers of the invention.

Two fully formulated automatic transmission fluids (ATF) A and B were tested in the Ford Aluminum Beaker Test which measures antioxidant properties and dispersancy. Fluids A and B are identical, differing only in the polymethacrylate VI improver. Representative Fluid A contains representative VI improver A which is the 57 wt. % of lube oil solution polymethacrylate-alkylbenzene product of Example I (38 wt. % polymethacrylate on a neat basis). Comparative VI Improver B employed in comparative Formulation B is a 41 wt. % lube oil solution of a 4:21:50:25 DMAEMA:BMA:NMA:AMA weight ratio polymethacrylate prepared in accordance with the procedure of Example I with the exception the entire polymerization was conducted in the presence of mineral lubricating oil rather than alkylbenzene.

The Ford Aluminum Beaker Test is described in the Ford Motor Company Applied Research Report ARM 65-19 of Sept. 15, 1965 and also in Society of Automotive Engineers paper No. 670023 of January 1967.

The test data and results are reported below:

| TEST BLEND COMPOSITION AND FORD ALUMINUM BEAKER TEST (FABT) RESULTS | | |
|---|---|---|
| ATF Blend Comp. Wt. % | A | B |
| Mineral Lube Oil (100 SUS at 100° F.) | 89.5 | 89.5 |
| ATF Additive Mixture* | 5.5 | 5.5 |
| VI Improver | 5.0 | 5.0 |
| Red Dye, ppm | 128 | 128 |
| New Oil Data | | |
| Kin. Vis., 100° F. | 33.9 | 41.2 |
| Kin. Vis., 210° F. | 6.52 | 8.11 |
| Brookfield Vis., cp, −40° F. | 27,000 | 33,200 |
| Total Acid No. | 0.86 | 1.10 |
| FABT Results (Terminal Data) | | |
| Rating (10=clean) | 9.0 | 8.7 |
| Kin. Vis., cs, 100° F. | 111.0 | 299.4 |
| Kin. Vis., cs, 210° F. | 21.1 | 47.5 |
| TAN | 6.67 | 6.68 |
| Pentane Insolubles, % | 0.07 | 0.60 |

*47 wt. % Boron/polyalkenylsuccinimide reaction product, 8 wt. % zinc methylisobutylcarbinyl dithiophosphate, 3 wt. % phenyl-α-naphthylamine, 42 wt. % mineral oil.

As can be seen from the foregoing, for an equivalent amount of polymeric nitrogen content the polymethacrylate-alkylbenzene complex VI improvers of the invention are substantially more effective dispersants as measured by the "Rating" in the above test. Further, the resistance to oxidation of the polymethacrylate-alkylbenzene complex is shown to be superior by comparing the difference in kinematic viscosity between the new and tested oils, i.e., the change in viscosity being substantially less for the formulations containing representative VI Improver A than comparative Formulation B.

We claim:

1. A complex polymethacrylate-liquid alkylbenzene product of a polymethacrylate to alkylbenzene component weight ratio of between about 4:1 and 2:3, said liquid alkylbenzene of a molecular weight between about 100 and 5000, said polymethacrylate of a molecular weight of between about $5 \times 10^4$ and $10^6$ composed of the following monomeric elements.

a. between about 1 and 10 wt. % dialkylaminoalkyl methacrylate characterized by the formula:

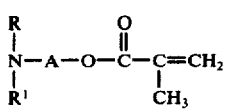

R and R¹ are alkyl of from 1 to 2 carbons
A is alkanediyl of from 1 to 5 carbons b. between about 15 and 30 wt. % $C_1$–$C_6$ alkyl methacrylate characterized by the formula:

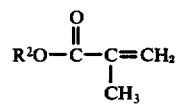

where R² is alkyl of from 1 to 6 carbons c. between 40 and 60 wt. % of $C_{10}$–$C_{14}$ alkyl methacrylate characterized by the formula:

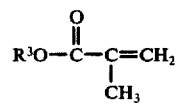

where R³ is alkyl of from 10 to 14 carbons d. between about 15 and 30 wt. % of $C_{16}$–$C_{20}$ alkyl methacrylate characterized by the formula:

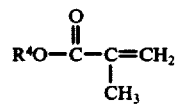

where R⁴ is alkyl of from 16 to 20 carbons, said complex product prepared by polymerizing said monomeric elements in the ratios as defined in the presence of said liquid alkylbenzene.

2. A mineral oil composition comprising between about 10 and 95 wt. % mineral lubricating oil and between about 0.1 and 90 wt. % of a complex polymethacrylate-alkylbenzene product of a polymethacrylate to alkylbenzene component weight ratio of between about 4:1 and 2:3, said liquid alkylbenzene of a molecular weight between about 100 and 5000, said polymethyacrylate interpolymer of a molecular weight of between about $5 \times 10^4$ and $10^6$ composed of the following monomeric elements.

a. between about 1 and 10 wt. % dialkylaminoalkyl methacrylate characterized by the formula:

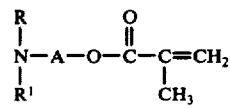

where R and R¹ are alkyl of from 1 to 2 carbons A is alkanediyl of from 1 to 5 carbons b. between about 15 and 30 wt. % $C_1$–$C_6$ alkyl methacrylate characterized by the formula:

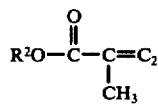

where R² is alkyl of from 1 to 6 carbons c. between about 40 and 60 wt. % of $C_{10}$–$C_{14}$ alkyl methacrylate characterized by the formula:

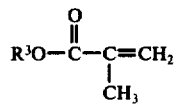

where $R^3$ is alkyl of from 10 to 14 carbons d. between about 15 and 30 wt. % of $C_{16}$-$C_{20}$ alkyl methacrylate characterized by the formula:

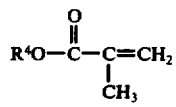

where $R^4$ is alkyl of from 16 to 20 carbons said complex product prepared by polymerizing said monomeric elements in the ratios defined in the presence of said liquid alkylbenzene component.

3. A mineral lubricating oil composition in accordance with claim 2 wherein said complex product content is between about 10 and 90 wt. %.

4. A mineral lubricating oil composition in accordance with claim 2 wherein said complex product content is between about 0.1 and 10 wt. %.

5. A complex product in accordance with claim 1 wherein said alkylbenzene is dialkylbenzene of a molecular weight of about 405.

6. A mineral lubricating oil composition in accordance with claim 2 wherein said alkylbenzene is dialkylbenzene of a molecular weight of about 405.

* * * * *